United States Patent

[11] 3,565,456

| [72] | Inventor | Harry Zoltok |
| | | Winnipeg, Manitoba, Canada |
| [21] | Appl. No. | 784,018 |
| [22] | Filed | Dec. 16, 1968 |
| [45] | Patented | Feb. 23, 1971 |
| [73] | Assignee | Motor Coach Industries Limited |
| | | Winnipeg, Manitoba, Canada |

[54] REAR SUSPENSION FOR VEHICLES
8 Claims, 7 Drawing Figs.
[52] U.S. Cl.................................................. 280/106.5,
280/124
[51] Int. Cl................................................... B60g 25/00

[50] Field of Search.......................................... 280/106,
106.5, 124 (F)

[56] References Cited
UNITED STATES PATENTS
2,902,291  9/1959  Walker......................... 280/124F
2,988,375  6/1961  Lich............................. 280/124F

*Primary Examiner*—Philip Goodman
*Attorney*—Kent and Ade

ABSTRACT: A subframe is provided between the rear axle assembly and the rear end of the vehicle body having outrigger ends supporting air springs substantially above the outer wheels of the dual rear wheels thus increasing the transverse stability of the rear suspension.

PATENTED FEB 23 1971

INVENTOR
HARRY ZOLTOK.

BY *(signature)*

ATTORNEY

INVENTOR
HARRY ZOLTOK

BY

ATTORNEY

3,565,456

REAR SUSPENSION FOR VEHICLES

This invention relates to new and useful improvements in rear suspensions for vehicles, particularly motor coaches and the like.

Conventionally, the body of a vehicle is supported upon the rear axle inboard of the wheels and with a transverse spacing of, for example, 31½inches in conventional design.

This limits the height of the motor coach as it will be appreciated that there is considerable sidesway and "lean" on corners, unless care is taken.

I have overcome this disadvantage by providing a subframe having outrigger ends which enables the spring connections between the body and the vehicle to be placed just above the outer wheels of the dual wheel rear axle thus giving a lateral spacing between the suspension points of 80 inches.

This results in greatly improved sideways stability, much higher resistance to overturning tendencies and reduces sidesway and "lean" on corners.

Further advantages flowing from this invention are improved steering and handling characteristics, position in approaching curves and corners being less critical due to reduced "lean" or "roll" and improved weight distribution of the vehicle either empty, partly or fully loaded.

These advantages also increase the road holding characteristics even under wet or slippery road conditions or on severe brake applications.

In summary, I have provided a subframe between the vehicle body and the rear axle which enables the conventional air springs to be placed outboard of the normal positions by an amount approximately 2½times the normal thus giving a considerable improvement to the overall stability of the vehicle and enabling vehicle bodies of greater height and width to be built.

With the foregoing considerations in view, and such other objects, purposes or advantages as may become apparent from consideration of this disclosure and specification, the present invention consists of the inventive concept which embraces or includes the method, process, construction, arrangement of parts, or new use of any of the foregoing, as herein particularly exemplified in one or more specific embodiments of such concept, reference being had to the accompanying drawings in which.

In the drawings like characters of reference indicate corresponding parts in the different FIGS.

Figure 2:
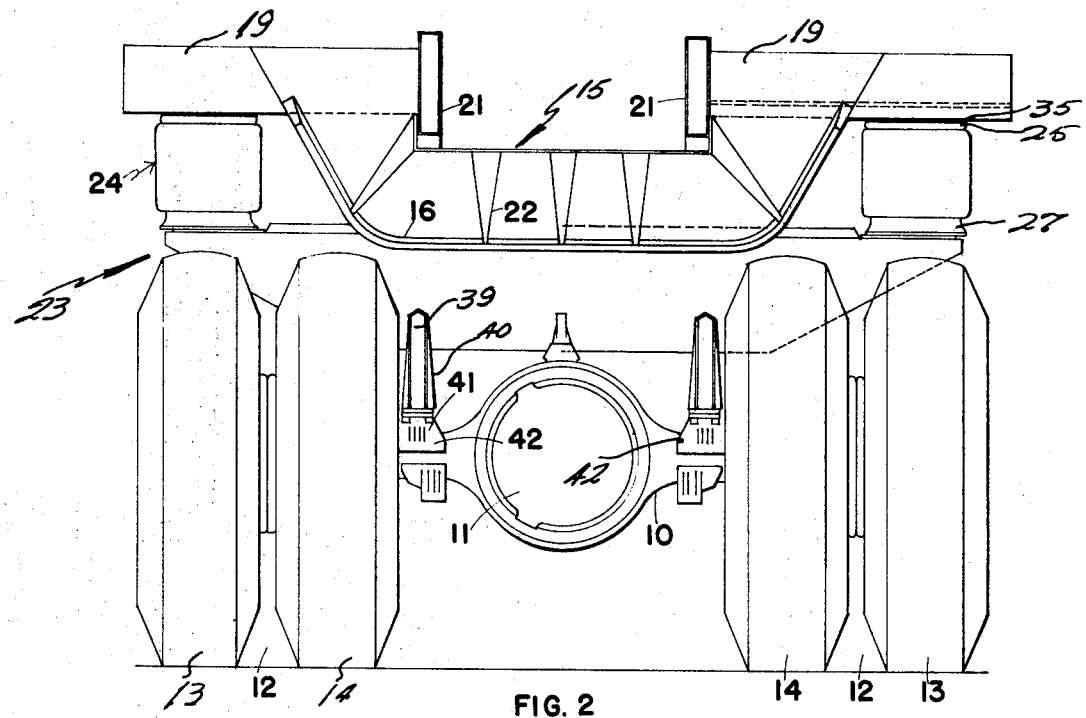
FIG. 2 is a rear view of the rear end of the vehicle with only a portion of the body bogie being shown.
Figure 1:
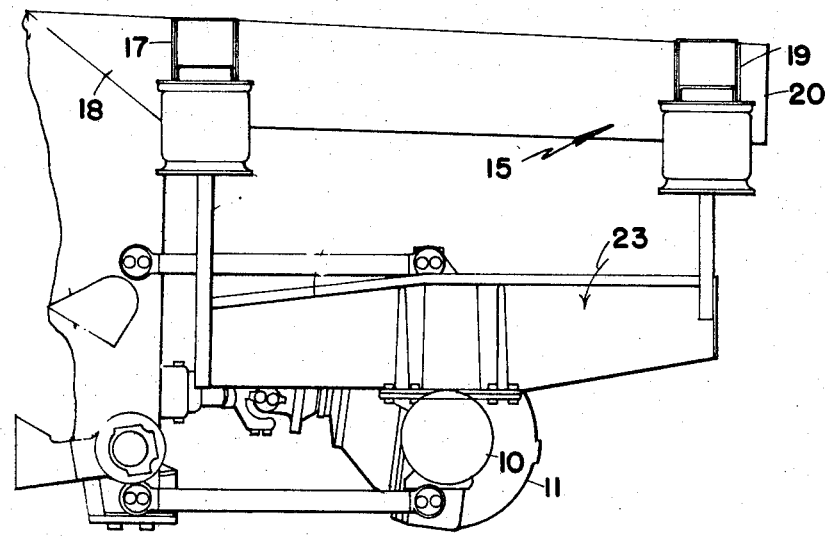
FIG. 1 is a side view of the rear end of the vehicle with the wheels removed for clarity.

Proceeding therefore to describe the invention in detail, reference should first be made to FIGS. 1 and 2 in which 10 illustrates a conventional rear axle assembly with differential 11 and dual rear wheels 12 mounted on the ends of the rear axle assembly, said dual rear wheels including an outer wheel 13 and an inner wheel 14.

Reference character 15 illustrates generally a rear bogie assembly forming part of the body of the vehicle, said body not being shown. However, the rear bogie portion includes a cradle frame 16 and front outrigger ends 17 extending outwardly from the forward end 18 of this cradle frame. Corresponding outrigger ends 19 extend outwardly from the sides of the cradle frame adjacent the rear end 20 thereof. FIG. 2 shows portions of the longitudinal frame members 21 upon which the body is built and supported, gusset plates 22 bracing these to the cradle frame 16.

A subframe assembly collectively designated 23 connects the cradle frame or bogie to the rear axle assembly by means of air spring assemblies collectively designated 24 as will hereinafter be described.

Figure 7:
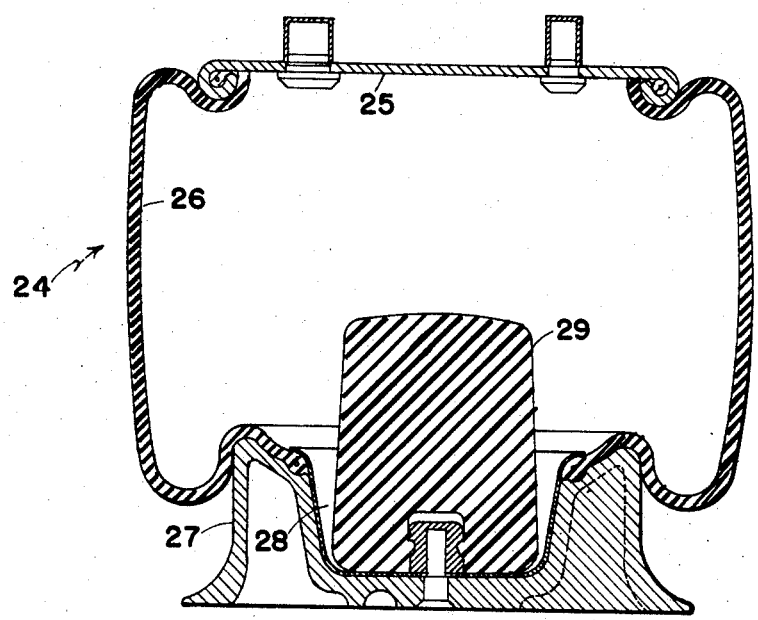
FIG. 7 is a section of one of the air spring assemblies.

Although these air spring assemblies are conventional, FIG. 7 shows details of the construction which includes an upper substantially circular bead plate 25, a substantially cylindrical bellows portion 26 formed of resilient rubber or similar material and a lower fixed piston portion 26 which is depressed centrally as at 28, said depression supporting a resilient rubber bumper 29 which extends upwardly into the bellow portion as clearly shown.

The bellows is air loaded and sealed so that the resistance of the air springs can be controlled and the bumper 29 takes care of overload conditions or leaking or punctured bellows.

Figure 3:
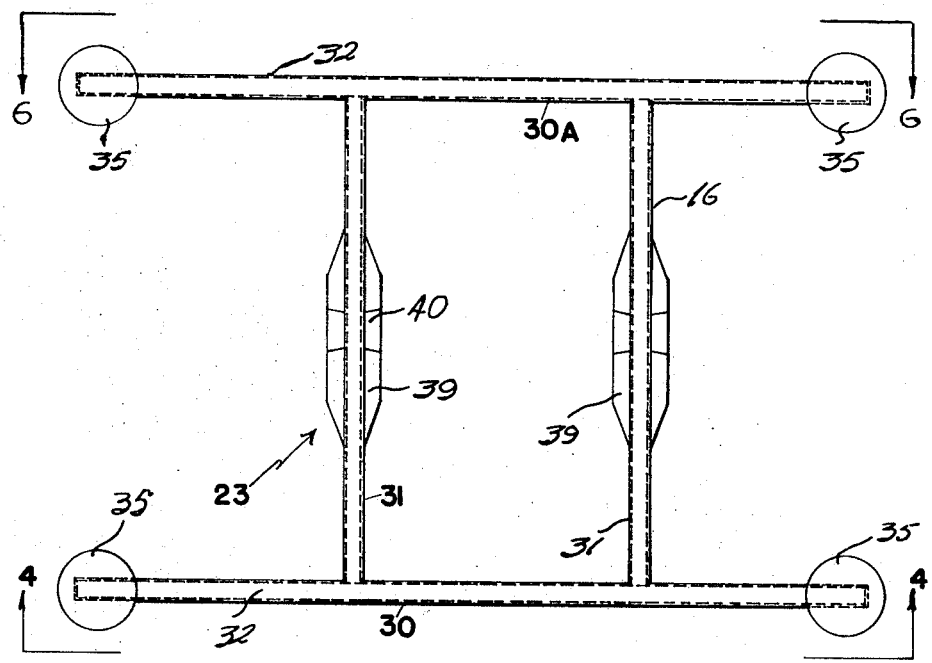
FIG. 3 is a plan view of the subframe.

FIGS. 3 to 6 inclusive show details of the construction of the subframe 23 which includes a pair of spaced and parallel transverse outrigger beams 30 and a pair of spaced and parallel longitudinal beams 31 extending between the outrigger beams 30 and inboard of the ends thereof as clearly shown in FIG. 3 thus presenting an H-frame configuration.

Each of the outrigger beams 30 consists of an upper plate or portion 32 and supporting girders extending therebelow all of which are encased within metal cladding 34 to completely seal the beam. Air spring receiving pads 35 are secured as by welding to the outer ends of these outrigger beams 30, said pads being circular as clearly shown in the drawings.

Figure 4:
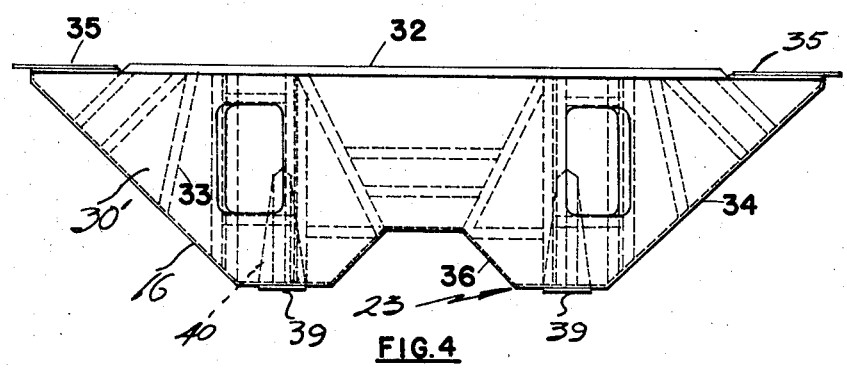
FIG. 4 is a rear view of the subframe along the line 4—4 of FIG. 3.
Figure 6:
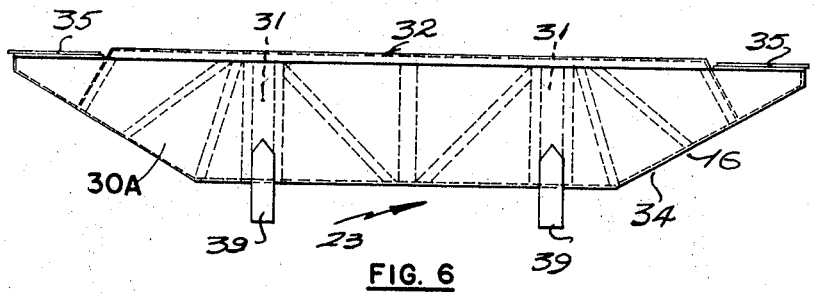
FIG. 6 is a front view of FIG. 3 along the line 6—6 of FIG. 3.

The outrigger beam at the rear of the H-beam assembly, specifically designated 30', is shown in FIG. 4 and the configuration of the front beam specifically designated 30A is shown in FIG. 6. The construction of the two beams is similar but the dimensions vary as much as the depth of beam 30A is less than beam 30', and beam 30 is provided with a centrally located recess or cutaway portion 36 upon the underside thereof for clearance purposes.

Figure 5:
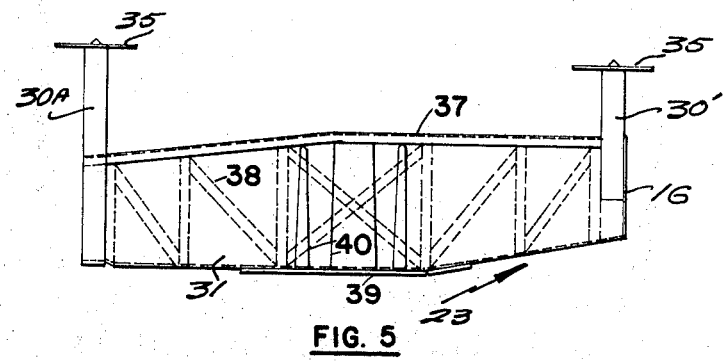
FIG. 5 is a view at right angles to FIG. 4.

These beams, when viewed in end elevation as shown in FIG. 5, are of relatively narrow cross section and the aforementioned air spring plates 35 are situated in a plane substantially above the upper surface 37 of the longitudinal beams 31 as clearly shown in FIG. 5.

The beams 31 are formed of girder construction as shown in phantom at 38 in FIG. 5, and axle clamp attaching plates 39 are secured upon the underside of these beams 31 and stabilized by means of gussets 40 as clearly shown. These plates engage with upper castings 41 of axle clamps 42 which are bolted around the axle thus securing the subframe to the axle one upon each side of the differential housing 11.

The aforementioned air springs 24 are secured by the pistons 27 to the air spring support plates 35 upon the subframe and by the bead plates 25, to the outrigger ends 17 and 19 of the rear bogie assembly 15. This securement is conventional and is not shown in the drawings but may take the form of bolts or similar attaching means.

When assembled, the air springs 24 are situated substantially above the outer wheels 13 of the dual rear wheel assemblies 12 and in the accompanying claims, the position of these air springs is defined as being outboard the inner rims of the inner wheels of the rear wheel assemblies.

The normal position of air spring attachments are inboard of the wheel assemblies and the provision of this subframe with the outrigger ends enables these air springs to be placed as wide apart as possible thus giving the additional stability required by present day motor coaches and the like.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

I claim:

1. In a vehicle which includes a rear axle assembly, dual wheels on each end of said axle assembly, and a rear body supporting bogie forming part of the body of said vehicle; suspension means between said bogie and said axle assembly, said suspension means including a subframe assembly, said subframe assembly including a pair of transverse outrigger beams and a pair of longitudinal beams extending between said outrigger beams and inboard of the ends thereof, means securing said longitudinal beams to said rear axle and air springs on the ends of said outrigger beams supporting said bogie, said air springs being situated outboard of the inner rim of the innermost of said rear wheels.

2. The device according to claim 1 in which said bogie includes a cradle frame forming part of the associated vehicle body and front and rear outrigger ends on each side of said frame, said outrigger ends receiving the upper ends of said air springs.

3. The device according to claim 1 in which said transverse outrigger beams include a substantially horizontal upper member and girder member portions secured to the underside of said member and extending therebelow, and air spring receiving pads on the outer ends of said upper member, said girder member portions being enclosed, said outrigger beam having a relatively narrow cross section, said pads lying in a plane spaced above the upper surface of said longitudinal beams.

4. The device according to claim 2 in which said transverse outrigger beams include a substantially horizontal upper member and girder member portions secured to the underside of said member and extending therebelow, and air spring receiving pads on the outer ends of said upper member, said girder member portions being enclosed, said outrigger beam having a relatively narrow cross section, said outrigger beam having a relatively narrow cross section, said pads lying in a plane spaced above the upper surface of said longitudinal beams.

5. The device according to claim 1 in which each of said longitudinal beams includes a horizontally disposed axle clamp attaching plate and gusset means to stabilize said plate to said longitudinal beam.

6. The device according to claim 2 in which each of said longitudinal beams includes a horizontally disposed axle clamp attaching plate and gusset means to stabilize said plate to said longitudinal beam.

7. The device according to claim 3 in which each of said longitudinal beams includes a horizontally disposed axle clamp attaching plate and gusset means to stabilize said plate to said longitudinal beam.

8. The device according to claim 4 in which each of said longitudinal beams includes a horizontally disposed axle clamp attaching plate and gusset means to stabilize said plate to said longitudinal beam.